United States Patent [19]

Ro et al.

[11] Patent Number: 6,066,702
[45] Date of Patent: May 23, 2000

[54] METHOD FOR POLYMERIZATION OF AN α-OLEFIN

[75] Inventors: Ki-Su Ro; Il-Seop Kim; Chun-Byung Yang; Youn-Seok Park, all of Taejon, Rep. of Korea

[73] Assignee: Samsung General Chemicals Co., Ltd., Chungcheongnam-do, China

[21] Appl. No.: 09/074,079

[22] Filed: May 7, 1998

[30] Foreign Application Priority Data

May 8, 1997 [KR] Rep. of Korea ..................... 97/17650

[51] Int. Cl.$^7$ ..................................... C08F 4/44
[52] U.S. Cl. ............................ 526/125.3; 526/124.3; 526/124.9; 526/125.1; 526/125.6; 526/128; 502/125
[58] Field of Search .................. 526/125.1, 125.3, 526/124.9, 128, 124.3, 125.6; 502/125

[56] References Cited

U.S. PATENT DOCUMENTS

| | | |
|---|---|---|
| 4,069,169 | 1/1978 | Toyoda et al. . |
| 4,071,672 | 1/1978 | Kashiwa . |
| 4,071,674 | 1/1978 | Kashiwa et al. . |
| 4,076,942 | 2/1978 | Toyota et al. . |
| 4,085,276 | 4/1978 | Toyota et al. . |
| 4,107,413 | 8/1978 | Giannini et al. . |
| 4,107,414 | 8/1978 | Giannini et al. . |
| 4,156,063 | 5/1979 | Giannini et al. . |
| 4,157,435 | 6/1979 | Toyota et al. . |
| 4,187,196 | 2/1980 | Giannini et al. . |
| 4,220,554 | 9/1980 | Scatá et al. . |
| 4,226,963 | 10/1980 | Giannini et al. . |
| 4,315,835 | 2/1982 | Scatá et al. . |
| 4,315,874 | 2/1982 | Ushida et al. . |
| 4,330,649 | 5/1982 | Kioka et al. . |
| 4,336,360 | 6/1982 | Giannini et al. . |
| 4,399,054 | 8/1983 | Ferraris . |
| 4,401,589 | 8/1983 | Kioka et al. . |
| 4,439,540 | 3/1984 | Cecchin et al. . |
| 4,806,433 | 2/1989 | Sasaki et al. . |
| 4,866,022 | 9/1989 | Arzoumanidis et al. . |
| 4,912,074 | 3/1990 | Miro . |
| 4,946,816 | 8/1990 | Cohen et al. . |
| 4,952,649 | 8/1990 | Kioka et al. . |
| 4,978,648 | 12/1990 | Barbé et al. . |
| 4,988,656 | 1/1991 | Arzoumanidis et al. . |
| 4,990,479 | 2/1991 | Ishimaru et al. ............... 502/125 |
| 5,013,702 | 5/1991 | Arzoumanidis et al. . |
| 5,081,090 | 1/1992 | Arzoumanidis et al. . |
| 5,124,297 | 6/1992 | Arzoumanidis et al. . |
| 5,134,104 | 7/1992 | Sasaki et al. . |
| 5,175,332 | 12/1992 | Chatterton et al. . |
| 5,182,245 | 1/1993 | Arzoumanidis et al. . |
| 5,244,996 | 9/1993 | Kawasaki et al. ............... 526/347 |
| 5,502,128 | 3/1996 | Flores et al. . |
| 5,780,378 | 7/1998 | Toida et al. . |
| 5,844,046 | 12/1998 | Ohgizawa et al. ............... 525/270 |
| 5,849,654 | 12/1998 | Fushimi et al. ............... 502/125 |

FOREIGN PATENT DOCUMENTS

| | | |
|---|---|---|
| 0 602 922 | 6/1994 | European Pat. Off. . |
| 0 606 125 A2 | 7/1994 | European Pat. Off. . |
| 58-83006 | 5/1983 | Japan . |
| 63-54004 | 10/1988 | Japan . |

OTHER PUBLICATIONS

Dialog–Web search results for English–language abstract for Japanese patent No. 58 83006 published Sep. 23, 1998 (2 sheets).

Dialog–Web search results for English–language abstract for Belgium patent No. 895019 A published Jan. 19, 1999 (1 sheet).

Dialog–Web search results for English–language abstract for Germany patent No. 3241999 C published Jan. 19, 1999 (1 sheet).

Dialog–Web search results for English–language abstract for United Kingdom patent No. 2,111,066 published Jan. 19, 1999 (1 sheet).

Dialog–Web search results for English–language abstract for Japanese patent No. 63 191811 published Sep. 24, 1998 (1 sheet).

Dialog–Web search results for English–language abstract for Japanese patent No. 63 40711 published Oct. 6, 1998 (1 sheet).

Tinkler, et al, "Polymerisation of Ethene by the Novel Titanium Complex $[Ti(Me_3SiNCH_2\ CH_2NSi\ Me_3)Cl_2]$;a Metallocene Analogue," Chemical Communications, Cambridge, England, UK, 1996, pp. 2623–2624.

Edelmann, "N–silylated Benzamidines: Versatile Building Blocks in Main Group and Coordination Chemistry," published in Coordination Chemistry Reviews, 1994, vol. 137, pp. 403–481.

Zhou, et al, "Synthesis and Structure of Novel Bridged Dinuclear Indium Complexes," Inorganic Chemistry, published by the American Chemical Society, vol. 35, 1996, pp. 1423–1424.

Zhou, et al, Bulky Amidinate Complexes of Tin(IV). Synthesis and Structure of $Sn(RNC(R')NR)_2Cl_2$ (R=Cyclohexyl, R'=H, Me; R=SiMe$_3$, R'=$^t$Bu), Inorganic Chemistry, published by the American Chemical Society, vol. 36, 1997, pp. 501–504.

(List continued on next page.)

*Primary Examiner*—David W. Wu
*Assistant Examiner*—Roberto Rabago
*Attorney, Agent, or Firm*—Conley, Rose & Tayon, PC

[57] ABSTRACT

A method for polymerization or copolymerization of α-olefin, characterized in that the polymerization is performed using a solid complex titanium catalyst comprising magnesium, a halogen-containing titanium compound, and internal electron donors; organometallic compounds of metals belonging to Groups I and III on the periodic table of elements; and, as external electron donors, a mixture of three or more kinds of organic silicon compounds, from which homopolyolefins having MFR less than 5, MFR in the range from 5 to 20, and MFR greater than 20 are polymerized under the same polymerization conditions. By use of the present invention it is possible to produce an olefin polymer with high stereoregularity, broad molecular weight distribution, and good fluidity, at high rates of yield.

7 Claims, No Drawings

OTHER PUBLICATIONS

Linden, et al, "Polymerization of α–Olefins and Butadiene and Catalytic Cyclotrimerization of 1–Alkynes by a New Class of Group IV Catalysts. Control of Molecular Weight and Polymer Microstucture via Ligand Tuning in Sterically Hindered Chelating Phenoxide Titanium and Zirconium Species," Journal of the American Chemical Society, vol. 117, 1995, pp. 3008–3021.

Stokes, et al., "Reactions of Cobaloxime Anions and/or Hydrides with Enynes as a New, General Route to 1,3– and 1,2–Dienylcobaloxime Complexes," Organometallics, 1996, vol. 15, pp. 2624–2632.

Dialog–Web search results for English–language abstract for Japanese patent No. 73–16986 published Dec. 5, 1995 (1 sheet).

Dialog–Web search results for English–language abstract for Japanese patent No. 73–16987 published Dec. 5, 1995 (1 sheet).

Dialog–Web search results for English–language abstract for German patent No. 2,153,520 published Oct. 29, 1970 (1 sheet).

Dialog–Web search results for English–language abstract for German patent No. 2,230,672 published Jun. 25, 1971 (4 sheets).

Dialog–Web search results for English–language abstract for German patent No. 2,230,728 published Dec. 27, 1972 (1 sheet).

Dialog–Web search results for English–language abstract for German patent No. 2,230,752 published Dec. 27, 1972 (1 sheet).

Dialog–Web search results for English–language abstract for German patent No. 2,504,036 published Feb. 1, 1974 (1 sheet).

Dialog–Web search results for English–language abstract for Japanese patent No. 51–136625(76136625) published Nov. 12, 1976 (1 sheet).

Dialog–Web search results for English–language abstract for Japanese patent No. 5287486 published Apr. 10, 1992 (1 sheet).

Dialog–Web search results for English–language abstract for Japanese patent No. 54–040239 (7940239) published Mar. 29, 1979 (1 sheet).

Dialog–Web search results abstract for Canadian patent No. 1040379 published Oct. 17, 1978 (1 sheet).

Dialog–Web search results for English–language abstract for EP patent No. 305170 published Mar. 1, 1989 (1 sheet).

Dialog–Web search results for English–language abstract for EP patent No. 602922 published Jun. 22, 1994 (1 sheet).

Dialog–Web search results for English–language abstract for German patent No. 2553104 publsihed Jun. 8, 1977 (1 sheet).

METHOD FOR POLYMERIZATION OF AN α-OLEFIN

BACKGROUND OF INVENTION

The present invention generally relates to a method for producing an olefin polymer or copolymer of high stereospecificity at a high rate of yield, while controlling the polymer's molecular weight distribution, when applied to polymerization or copolymerization of α-olefin having three or more carbon atoms.

In general, the olefin polymer produced with a $MgCl_2$ supported catalyst has a narrow distribution of molecular weights. Many efforts have been made to broaden the distribution of molecular weights, so as to improve at the time of processing the flow characteristics of the product produced by this catalyst. For this, a method has been in wide use, in which polymers of different distributions of molecular weights are first made by the use of a plurality of polymerization reactors and later mixed, but this has disadvantages in that it requires much time and effort and the product is often found to be very uneven. In a recent report, from Mitsui Petrochemical of Japan (publication No. 93-665, of Korean Patent), a method has been proposed in which an olefin polymer with a wider distribution of molecular weights is produced by the use of two particular electron donors, from which homopolyolefin's having a melt flow rate (MFR) ratio greater than 31.6 are respectively polymerized in the same polymerization conditions. In this case, however, the catalyst's activity is reduced too low for it to be commercially useful, and not merely is its molecular weight distribution difficult to control, but the catalyst's reactivity with hydrogen, which controls the molecular weight distribution of the polymer, is so low as to pose many limitations on the management of its processing.

Meanwhile, many other techniques are known to produce polymers or copolymers of high stereospecificity by the use of solid complex titanium catalysts containing magnesium with electron donors, and also titanium and a halogen, as catalyst for polymerization or copolymerization of α-olefin which contains more than three atoms of carbon (e.g. Japanese. Pts. Laid-Open Nos. 73-16986 and 73-16987, Ger. Pts. Laid-Open No.2,153,520; 2,230,672; 2,230,-728; 2,230, 752; and 2,553,104).

These references reveal the use of mixture components of particular catalysts and the process for forming these catalysts. As is well known, the characteristics of these catalysts, containing solid complex titanium, vary from catalyst to catalyst, accordant with the different mixtures of components, different combinations of processes for formation, and the different combinations of these conditions. Therefore, it is very difficult to predict what effects can be obtained from a catalyst produced under a given set of conditions. Often, a catalyst having undesirable effects is produced. It is also often true that such characteristics as the activity of the catalyst or the stereospecificity of the polymer do not turn out to be adequate even if the catalyst is made under proper conditions, if proper external electron donors are not used.

The solid complex titanium catalyst containing magnesium, titanium, and halogen is no exception. In polymerizing or copolymerizing α-olefin containing more than three atoms of carbon, in the presence of hydrogen and with the use of a catalyst composed of titanium and an organometallic compound of metals belonging to Groups I through IV on the periodic table of elements, if a co-catalyst composed of titanium trichloride obtained by reducing titanium tetrachloride using metallic aluminum, hydrogen, or an organic aluminum compound is used, along with such electron donors as are known to restrain the formation of amorphous copolymer, the effects vary, depending upon the electron donors used. The cause is accepted to be that the electron donors are not mere inert additives, rather, they combine with the magnesium and titanium compounds electronically and sterically, thereby fundamentally altering the structure of the solid complex catalyst.

New methods for creating polymers of higher yields than the existing methods, by the use of certain silicone compounds, have been developed by Dow Corning of the U.S. (U.S. Pat. No. 5,175,332 and EP Laid-Open No. 602,922), Mitsui Petrochemical of Japan (Korean Pat. Pub. Nos. 92-2488 and 93-665; U.S. Pat. No. 4,990,479; EP Laid-Open No. 350,170; Canadian Pat. No. 1,040,379), and well-known European makers.

SUMMARY OF INVENTION

The problems outlined above may be solved by methods of controlling the molecular weight distribution of a polymer while still maintaining the activity of the catalyst. It is possible to maintain the activity of the catalyst and the stereospecificity of the polymer, while controlling the polymer's molecular weight distribution and increasing the catalyst's hydrogen reactivity, obtaining great profit in operation as well. In an embodiment, an α-olefin is polymerized or copolymerized using, as external electron donors, more than three kinds of organosilicon compounds, from which homopolyolefins having respectively a melt flow rate (MFR) or less than 5, from 5 to 20, more than 20 are polymerized by the use of each external electron donor under the same polymerization conditions.

In an embodiment a method for producing an olefin polymer or copolymer of high granular regularity, while controlling the olefin polymer's or copolymer's molecular weight distribution, when applied to production of an α-olefin polymer or copolymer having more than three atoms of carbon is described.

In another embodiment a method for producing a polypropylene and propylene copolymer adequate for use in production of film easily capable of being heat-sealed, transparent, and anti-blocking property, also adequate for shock resistance, fluidity and low temperature heat-sealable is described.

DETAILED DESCRIPTION OF INVENTION

A method for polymerizing or copolymerizing an α-olefin includes:

(a) a solid complex titanium catalyst includes magnesium, a halogen-containing titanium compound, and, as internal electron donor, an ester polycarboxylate;

(b) an organometallic compound of a metal of Groups I and III on the periodic table of elements.

(c) external electron donors comprising three or more kinds of organosilicon compounds, from which homopolyolefins respectively having MFR (Melt Flow Rate) less than 5, MFR in the range from 5 to 20, or an MFR greater than 20 are polymerized under the same polymerization conditions.

The solid complex titanium catalyst (a) used for polymerization or copolymerization of an α-olefin includes magnesium, a halogen-containing titanium compound, and, as internal electron donor, ester polycarboxylate.

The solid complex titanium catalyst used in the present invention has an excellent level of catalytic activity, compared with existing titanium catalysts, and is capable of creating a polymer having a broad molecular weight distribution and a high stereospecificity. It has a halogen/titanium molar ratio more than about 4, it is also a solid complex with practically no titanium compound separating out when washed in hexane at room temperature. The chemical construction of this solid complex is not known but it is presumed that the atoms of magnesium, as well as those of titanium, are firmly linked by halogen. In a preferable embodiment of the solid complex titanium used in the present invention, the halogen/titanium molar ratio is more than about 5, preferably more than about 8; a magnesium/titanium molar ratio over about 3, further preferably from about 5 to about 50, the electron donor/titanium molar ratio about 0.2 to about 6, preferably about 0.4 to about 3, even more preferably about 0.8 to about 2. The specific surface area is more than 10 $m^2/g$, preferably more than about 50 $m^2/g$, more preferably more than about 100 $m^2/g$. The X-ray spectrum of the solid complex titanium catalyst preferably shows either amorphous characteristics in disregard of the starting magnesium, or characteristics more amorphous than ordinary magnesium dihalide on the market.

The solid complex titanium catalyst may be produced by many methods. As the most widely practiced method, contacting a non-reductive magnesium compound with a titanium compound which contains halogen(s), and treating the product thereof, if necessary, with an electron donor, and these methods can all be used in the present invention also. Some of these methods are revealed in Ger. Pts. Laid-Open Nos. 2,230,672; 2,504,036; 2,553,104; and 2,605,922; and Japanese Pat. Laid-Open Nos. 51-28189; 51-136625; and 52-87486. The conventional method for producing the solid complex titanium compound, beginning from a liquid magnesium solution and containing an electron donor in the form of a liquid titanium compound, is described in Japanese pat. Laid-Open No. 79-40239.

The non-reductive magnesium compounds may include such magnesium halides as magnesium chloride, magnesium bromide, magnesium iodide, and magnesium fluoride; such alkoxymagnesium halides as methoxy magnesium chloride, ethoxymagnesium chloride, isopropoxymagnesium chloride, butoxymagnesium chloride, octoxymagnesium chloride; such aryloxymagnesium halides as phenoxymagnesium chloride and methylphenoxymagnesium chloride; such alkoxymagnesiums as ethoxymagnesium, isopropoxymagnesium, butoxymagnesium and octoxymagnesium; such aryloxymagnesium as phenoxymagnesium and dimethylphenoxymagnesium; and such magnesium salts of acid as laurylmagnesium and magnesium stearate. Magnesium compounds may be used in complex compounds with other metals or with mixtures of other metals. A mixture of two or more magnesium compounds may also be used. Preferable magnesium compounds are halgen containing magnesium compounds, and more preferable are magnesium chloride, alkoxymagnesium chloride, most preferably alkoxymagnesium chloride and aryloxymagnesium chloride which have C1 to C14 alkoxy, yet preferably aryloxymagnesium chloride which has C6 to C20 aryloxy.

The magnesium compounds listed above can be generally represented by brief general expressions, but there arise occasions at times where other closely related magnesium compounds can not be, because of different production methods. In such cases, they are generally believed to be mixtures of these compounds. For instance, those compounds obtained by reacting magnesium metals with alcohol or phenol in the presence of halosilane, phosphorus pentachloride, or thionyl chloride, or by heat-dissolution of Grignard reagent, or by dissolving Grignard reagent using hydroxyl groups, carbonyl ester groups, ether groups or others are all considered mixtures of a variety of compounds accordant with the different reagents or the different degrees of reaction; such compounds are also usable in the present invention.

In an embodiment non-reductive liquid magnesium compounds or solutions of magnesium compounds in hydrocarbon solvents are mainly used. Such compounds in the liquid state can be produced by reacting the non-reductive magnesium compounds listed above with at least one or more electron donors chosen from a group that includes alcohol, organic carboxylic acid, aldehyde, amines, and their mixtures in the presence or absence of a hydrocarbon solvent which can dissolve those magnesium compounds given above.

The hydrocarbon solvents used for the purpose include, for example, aliphatic hydrocarbons such as pentane, hexane, heptane, octane, decane, dodecane, and kerosene; alicyclic hydrocarbons such as cyclopentane, methylcyclopentane, cyclohexane, and methylcyclohexane; such aromatic hydrocarbons as benzene, toluene, xylene, ethylbenzene, cumen, and cymen; and halogenated hydrocarbons such as dichloroethane, dichloropropane, dichloroethylene, trichloroethylene, carbon tetrachloride, and chlorobenzene.

The magnesium compound solution of hydrocarbon solvents, can be produced by simple mixture, or by heating during mixing, or by mixing in the presence of an electron donor selected from the group that includes alcohol, aldehyde, amine, carboxylic acid, or their mixtures, or even by mixing these mixtures with other electron donors and heating them. However, this production method can be altered depending upon the type of magnesium and the solutions. When dissolving hydrogen-containing magnesium compound in a hydrocarbon solution, using alcohol as the electron donor, the quantities and proportions of the alcohol may differ depending upon the quantity and kinds of magnesium compounds and the hydocarbon solvent, but it is desirable to use at least 0.5 mol of an alcohol per 1 mol of the magnesium compound, preferably 1.0 to 20 mols, more preferably about 2.0 mols to about 10 mols.

In the case where alcohol having at least 6 atoms of carbon is used, if at least 0.5 mol, or preferably at least 1.0 mol of alcohol, per 1 mol of the halogen-containing magnesium compound, the halogen-containing compound can be dissolved and a catalyst component with high activity can be obtained with the use of only a small quantity of alcohol. If alcohol with 5 or fewer carbon atoms is used, the total quantity of the alcohol should be at least about 15 mols to 1 mol of the magnesium compound, and the catalyst component thus produced will have lower activity than when alcohol is used in the way stated above. Meanwhile, if aromatic hydrocarbon is used as the hydrocarbon solvent, the hydrogen-containing magnesium compound can be dissolved, regardless of the type of alcohol, by about 20 mols, preferably about 1.5 mols to 12 mols of alcohol, per 1 mol of the magnesium compound.

The reaction of halogen-containing magnesium and alcohol is performed preferably in a hydrocarbon solvent. This reaction is performed, dependent upon the kinds of the magnesium compound and alcohol, at room temperature or higher, e.g. in the range from about 30 degrees C. to 200 degrees C., or more preferably about 60 degrees C. to 150 degrees C., for a time in the range from about 15 minutes to about 5 hours, more preferably about 30 minutes to about 3 hours.

The alcohols used as electron donors in formation of a liquid magnesium compound include such aliphatic alcohols as 2-methylpentanol, 2-ethylpentanol, 2-ethylbutanol, n-heptanol, n-octanol, 2-ethylhexanol, decanol, dodecanol, tetradecyl alcohol, undecenol, oleyl alcohol, and stearyl alcohol; such alicyclic alcohols as cyclohexanol and methylcyclohexanol; and such aromatic alcohols as benzyl alcohol, methylbenzyl alcohol, isopropylenebenzylalcohol, a-methylbenzyl alcohol, and a, a-dimethylbenzyl alcohol, which all have at least 6 or, preferably 6 to 20 carbon atoms. For alcohols with 5 or fewer carbon atoms, methanol, ethanol, propanol, butanol, ethyleneglycol and methylcarbitol and the like can be used. The magnesium compounds in liquid form, produced as above, are crystallized into globular solids once again with the use of silicon tetrahalide, silicon alkylhalide, tin tetrahalide, tin alkylhalide, tin hydrohalide, titanium tetrahalide, and the like. The quantity of silicon compounds, tin compounds, or titanium compounds for use in the recrystallizing of liquid magnesium compounds into globular solids may be varied from case to case. It can be 0.1 mol to 20 mols per 1 mol of the magnesium compound. Preferably, it is 0.1 mol to 10 mols, more preferably 0.2 mol to 2 mols. The shapes and magnitudes of the magnesium carriers will also vary accordant with the conditions of the reaction. At the time of mixing the two compounds they must be maintained at a properly low temperature in order for them not to solidify during the reaction, with the product then being slowly heated to yield a solid. The temperature for recrystallizing of a liquid magnesium compound ranges from about −70 degrees C. to about 200 degrees C. In general, to obtain granular or globular forms high temperature is, preferably, avoided during the process of mixing. However, if the temperature of reaction is too low, precipitation of solid products will not take place, and, therefore, this reaction should be performed, preferably, at about 20 degrees C. to 150 degrees C.

The magnesium compound thus obtained may be reacted with a liquid titanium compound, in the presence of an internal electron donor, whereby a solid complex titanium catalyst is obtained. The titanium compound in liquid form to be reacted with a magnesium compound is preferably the tetravalence titanium compound in the general expression: $Ti(OR)_mX_{4-m}$ (Wherein R is a hydrocarbon group, X halogen atoms, m is a number from 0 to 4). The R represents an alkyl group with from 1 through 10 carbon atoms. Various titanium compounds can be used, titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(OC_4H_9)Cl_3$, $Ti(OC_2H_5)Br_3$, and $Ti(O(i-C_2H_5)Br_3$; alkoxytitanium dihalides such as $Ti(OCH_3)_2Cl_2$, $Ti(OC_2H_5)_2Cl_2$, $Ti(OC_4H_9)_2Cl_2$, and $Ti(OC_2H_5)_2Br_2$; alkoxytitanium halides such as $Ti(OCH_3)_3Cl$, $Ti(OC_2H_5)_3Cl$, $Ti(OC_4H_9)_3Cl$, and $Ti(OC_2H_5)_3Br$; and tetraalkoxytitanium mixtures such as $Ti(OCH_3)_4$, $Ti(OC_2H_5)_4$, and $Ti(OC_4H_9)_4$.

The titanium compound is used in a proportion of at least 1 mol, preferably 3 mols to about 200 mols, or, more preferably, approximately 5 mols to 100 mols, per 1 mol of the non-reductive magnesium compound. It is preferable to mix the magnesium compound with the liquid titanium compound at a low temperature, slowly raising it. For instance, the two compounds are brought into contact at −70 degrees C. to about 50 degrees C. at first to avoid a quick reaction, and the temperature is slowly raised to a temperature in the range from about 50 degrees C. to 150 degrees C. for the reaction to take effect for sufficient time, after which the product is washed in the hydrocarbon used for the polymerization reaction until no isolated titanium is detected. By this method an excellent solid complex titanium catalyst can be produced.

The internal electron donors used in production of the solid complex titanium catalyst can be generally, oxygen-containing electron donors such as water, alcohols, phenols, aldehydes, carboxylic acids, esters, ethers, and acid amides; along with nitrogen-containing electron donors such as ammonia, amines, nitriles, and isocyanate; and particularly alcohols having from 1 to 18 carbon atoms such as methanol, ethanol, propanol, pentanol, hexanol, octanol, dodecanol, octadecylalcohol, benzylalcohol, phenylethylalcohol, cumylalcohol, and isopropylbenzylalcohol; Ketones which have from 6 to 15 carbon atoms and which can contain lower alkyl groups such as phenol, cresol, xylene, ethylphenol, propylphenol, cumylphenol, and naphthol; aldehydes which have from 2 to 15 carbon atoms such as acetaldehyde, propionaldehyde, octylaldehyde, benzaldehyde, tolualdehyde, and naphtaldehyde; organic acid esters having from 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, chloromethyl acetate, dichloroethyl acetate, methyl methacrylate ethyl crotonate, ethyl cyclohexyl carboxylate, phenyl benzoate, benzyl benzoate, methyl toluate, ethyl toluate, amyl toluate, ethyl ethyl benzoate, methyl anisate, ethyl anisate, ethyl ethoxybenzoate, g-butyrolactone, s-valerolactone, cumalin, phthalide, cyclohexyl acetate, ethyl propionate, methyl butyrate, methyl valerate, methyl chloroacetate, ethyl dichloroacetate, methyl methacrylate, ethyl cycloate, phenyl benzoate, ethyl toluate, ethyl toluate, propyl benzoate, butyl benzoate, cyclohexyl benzoate, amyl toluate, methylene carbonate, and ethylene carbonate; halogen compounds having from 2 to 15 carbon atoms such as acetyl chloride, benzyl chloride, chlorotoluate, and chloroanisate; acid amides such as methyl ether, ethyl ether, isopropyl ether, butyl ether, amyl ether, tetrahydrofuran, anisole, and diphenyl ether; amines such as methyl amine, ethyl amine, diethyl amine, tributyl amine, piperidine, tribenzyl amine, amiline, pyridine, picoline, and tetramethylene diamine; nitriles such as acetonitrile, benzonitrile, and tolunitrile; and compounds of aluminum, silicon, tin, and the like which have the above-said functional groups in their molecules; in addition to these, catalysts reacted with certain electron donors are used in the present invention to produce an α-olefin polymer with improved stereospecificity and greater yield than otherwise. The preferable internal electron donors used in the present invention to produce a solid complex titanium catalyst are, in particular, ester derivatives of monoethylene glycol (MEG), diethylene glycol (DEG), triethylene glycol (TEG), polyethylene glycol (PEG), monopropylene glycol (MPG), and dipropylene glycol (DPG) such as, acetate, propionate, n- and iso-butyrate, benzoate, toluate, etc., the benzoates are monoethylene glycol monobenzoate, monoethylene glycol dibenzoate, diethylene glycol monobenzoate, diethylene glycol dibenzoate, diethylene glycol monobenzoate, triethylene glycol dibenzoate, monopropyl glycol monobenzoate, dipropylene glycol monobenzoate, tripropylene glycol monobenzoate, and others. These electron donors can be used in a mixture of two or more kinds, and particularly, esters of the aromatic group are preferable. These electron donors are not always needed at the start, they may also be introduced during the production of the solid complex titanium catalyst, and they may also be used as additives to other compounds or in the form of a complex. The quantity of the internal electron donor can be changed as required. It may be about 0.01 mol to about 10 mols, preferably about 0.01 mol to 5 mols, or further preferably 0.05 mol to about 1 mol, per 1 mol of the magnesium compound.

The polymers obtained through a slurry polymerization by using the resultant solid catalyst are granular or globular with excellent stereospecificity, a high bulk density, and good fluidity.

The aforesaid solid complex titanium catalyst can be profitably used in polymerization of such olefins as ethylene, propylene, and 1-butene or 4-methyl-1-pentene. This catalyst can be especially profitably used in the polymerization of α-olefin which has three or more carbon atoms, copolymerization of these, copolymerization of α-olefins which have ethylene by less than 10 mols, and in copolymerization of α-olefins which have both conjugated and nonconjugated dienes.

The organometallic compounds (b) used in the method of the present invention include, in particular, trialkyl aluminums such as tri-ethylaluminum and tributyl aluminum; alkenyl aluminum such as trisoprenyl aluminum; partly alkoxyfied alkyl aluminums, for example, dialkylaluminum alkoxides such as diethylaluminum ethoxide and dibutylaluminum butoxide; alkylaluminum sesquihalides and ethylaluminum dichlorides such as ethylaluminum sesquiethoxide and butylaluminum sesquiethoxide; alkylaluminum dihalide such as propylaluminum dichloride and butylaluminum dibromide; partly halogenized aluminum, for example, dialkylaluminum hydrides and ethylaluminum ethoxychlorides such as diethylaluminum hydrides and dibutylaluminum hydride; and partly alkoxyfied and halogenized alkyl aluminums such as butylaluminum butoxychloride and ethylaluminum ethoxybromide.

In the present invention, more than three kinds of organosilicon compounds are used as external electron donors during the polymerizing reaction to improve the stereospecificity of the produced polymer. The organosilicon compounds used in the present invention are, particularly, ethyltriethoxysilane, n-propyl triethoxysilane, t-butyl triethoxysilane, vinyltriethoxysilane, diphenyldimethoxysilane, phenylmethyldimethoxysilane, bis p-tolyldimethoxysilane, p-tolylmethyldimethoxysilane, dicyclopentyldimethoxysilane, dicyclohexylmethoxysilane, cyclohexylmethyldimethoxysilane, 2-norbornanetriethoxysilane, 2-norbornanemethyldimethoxysilane, enyldiethoxysilane, and others, or else, organometallic compounds including cyclopentyl, cyclopentenyl, cyclopentadienyl groups and their derivatives can also be used.

The polymerization reaction can be performed in a liquid or gaseous phase, but as the polymer produced with the use of the catalysts of the present invention is of even granularity and its bulk density is high, it is more fit to gaseous phase polymerization.

In polymerization of a liquid, such inactive solvents as hexane, heptane, and kerosene can be used as the reaction medium, olefin itself may also serve as the reaction medium. The preferable degree of concentration of the solid complex titanium catalyst (a), in the case of liquid polymerization is from about 0.001 mmol to about 5 mmols per 1 liter of the total of all reactants and solvents, as measured in terms of the titanium atoms, or more preferably about 0.001 mmol to about 0.5 mmol. In the case of gaseous polymerization, it is, also in terms of the titanium atoms, from about 0.001 mmol to about 5 mmols, more preferably about 0.001 mmol to about 1.0 mmol, yet more preferably 0.01 mmol to about 0.5 mmol per 1 liter of the total of all reactants and solvents.

The ratio of the aluminum atoms of component (b) of the organometallic compound per 1 mol of the titanium atoms in the solid complex titanium catalyst (a) is from about 1 mol to 2,000 mols, preferably about 5 mols to about 500 mols. The ratio of component (c) of external electron donors being from about 0.001 mol to 10 mols, or preferably about 0.01 mol to about 2 mol, more preferably about 0.05 mol to about 1 mol per 1 mol of the aluminum atoms of the components (b), as measured in terms of the silicon atoms.

The polymerization reaction using the catalyst of the invention is performed in the same way as in the ordinary method where a Ziegler-type catalyst is used. Note that this reaction is performed in the absence of oxygen and water. The olefin polymerization reaction is performed, preferably, at a temperature in the range from about 20 degrees C. to 200 degrees C., more preferably at about 50 degrees C. to 180 degrees C., and under a pressure ranging from about normal atmospheric pressure to 100 atmospheres, preferably from about 2 atmospheres to 50 atmospheres. The reaction can be performed either by batches, or semi-batch, or continuously, and can also be performed in two or more steps with different reaction conditions.

Below, embodiment of the present invention will be shown in further detail through examples and comparative examples:

EXAMPLE 1

[Production of Solid Titanium Catalyst, Components (a)]

Into a 1-liter glass reactor 5 g (0.053 mol) of $MgCl_2$ and 50 mol of n-decane were put and stirred in a nitrogenous atmosphere for an hour, then 25 ml (0.16 mol) of 2-ethyl-1-hexanol was slowly added to the mixture. The solution was heated up to 120 degrees C. and left to react for two hours, then 2 ml of diisobutylphthalate was added to it for reaction for an hour to obtain a homogeneous solution. The temperature was lowered to room temperature, 30 ml of $TiCl_4$ was added by drops, the reaction temperature was raised to 90 degrees C., and the solution was left to react for two hours to form a solid carrier. 2.0 g (0.007 mol) of monoethyleneglycol dibenzoate was added as the second electron donor, and the solution left to react at 90 degrees C. for an hour. The solid matter was recovered, and washed in refined hexane until no isolated titanium tetrachloride could be found in the washing liquid. Refined heptane was put to the carrier obtained, 40 mol of $TiCl_4$ was dropped into it for an hour, it was heated to 100 degrees C., and left to react for two hours. The solid catalyst thus produced was washed in refined hexane until no isolated titanium components were detected in the hexane, then dried, and stored away in a nitrogenous atmosphere for later use. The solid complex titanium catalyst (a) contained titanium atoms by 2.5 wt %.

(Polymerization)

A high pressure reactor of 2-liter capacity was washed with propylene, 38 mg of catalyst (titanium components being 0.02 mmol, measured in terms of the titanium atoms) in a glass vial was placed inside the reactor, and the reactor was evacuated and refilled with nitrogen three times. Then 10 mmol of triethylaluminum was put into the reactor together with 0.1 mmol of dicyclopentyldimethoxysilane, 0.8 mmol of cyclohexylmethyldimethoxysilane, 0.1 mmol of vinylethoxysilane, and 1000 ml of n-hexane, these latter as external electron donors. After the hexane was put in, 100 Nml (0 degrees C., 1 atm) of hydrogen was put in, and the temperature was raised to 70 degrees C. Propylene gas, its water and oxygen previously removed in an oxygen scavenger and molecular sieve trap, was put in a polymerization reactor (2-liter Parr reactor, Model 4521) through an MFC (Mass Flow Controller). When the propylene reached gas/liquid equilibrium at an overall pressure of $7kg/cm^2$, the vial inside the reactor was broken with the stirrer, thus letting the reaction begin. The reaction was left to continue for one hour, then the high pressure contents were cooled to room temperature, and 10 ml of ethanol was added thereto to end the catalyst activity. The polymer thus produced was recovered, dried in a vacuum oven at 50 degrees C. for about six hours, and thereby 140.6 g of polypropylene was obtained in powder form. In this polymer, the rate of residue remaining after extraction by boiling in n-heptane was 98.0%, while the bulk density was 0.41 g/ml, the MFR 6.3, and the molecular weight distribution (Mw/Mn) 6.9. The melt flow rate was measured by ASTM D1238 and 230° C. with a load of 2.16 Kg.

EXAMPLE 2

Except that 0.15 mmol of dicyclopentyldimethoxysilane, 0.7 mmol of cyclohexylmethyldimethoxysilane, and 0.15 mmol of vinyltriethoxysilane were used as external electron donors, the polymerization was performed in exactly the same way as in Example 1, the results being shown in Table 1.

EXAMPLE 3

Except that 0.2 mmol of dicyclopentyldimethoxysilane, 0.6 mmol of cyclohexylmethyldimethoxysilane, and 0.2 mmol of vinyltriethoxysilane were used as external electron donors, the polymerization was performed in exactly the same way as in Example 1, the results being shown in Table 1.

EXAMPLE 4

Except that 0.25 mmol of dicyclopentyldimethoxysilane, 0.5 mmol of cyclohexylmethyldimethoxysilane, and 0.25 mmol of vinyltriethoxysilane were used as external electron donors, the polymerization was performed in exactly the same way as in Example 1, the results being shown in Table 1.

EXAMPLE 5

Except that 0.45 mmol of dicyclopentyldimethoxysilane, 0.1 mmol of cyclohexylmethyldimethoxysilane, and 0.45 mmol of vinyltriethoxysilane were used as external electron donors, the polymerization was performed in exactly the same way as in Example 1, the results being shown in Table 1.

EXAMPLE 6

Except that 0.25 mmol of dicyclopentyldimethoxysilane, 0.5 mmol of cyclohexylmethyldimethoxysilane, and 0.25 mmol of vinyltriethoxysilane were used as external electron donors, and that 200 Nml of hydrogen was added thereto, the polymerization was performed in exactly the same way as in Example 1, the results being shown in Table 1.

EXAMPLE 7

Except that 0.25 mmol of dicyclopentyldimethoxysilane, 0.5 mmol of cyclohexylmethyldimethoxysilane, and 0.25 mmol of vinyltriethoxysilane were used as external electron donors, and that 400 Nml of hydrogen was added thereto, the polymerization was performed in exactly the same way as in Example 1, the results being shown in Table 1.

Comparative Example 1

Except that 1.0 mmol of dicyclopentyldimethoxysilane was used as external electron donor, the polymerization was performed in exactly the same way as in Example 1, the results thereof being shown in Table 1.

Comparative Example 2

Except that 1.0 mmol of cyclohexylmethyldimethoxysilane was used as external electron donor, the polymerization was performed in exactly the same way as in Example 1, the results thereof being shown in Table 1.

Comparative Example 3

Except that 1.0 mmol of vinyltriethoxysilane was used as external electron donor, the polymerization was performed in exactly the same way as in Example 1, the results thereof being shown in Table 1.

Comparative Example 4

Except that 0.5 mmol of dicyclopentyldimethoxysilane and 0.5 mmol of vinyltriethoxythoxysilane was used as external electron donor, the polymerization was performed in exactly the same way as in Example 1, the results thereof being shown in Table 1.

Comparative Example 5

Except that 0.5 mmol of dicyclopentyldimethoxysilane and 0.5 mmol of vinylethoxysilane were used as external electron donors, and 200 Nml of hydrogen was put in, the polymerization was performed in exactly the same way as in Example 1, the results thereof being shown in Table 1.

Comparative Example 6

Except that 0.5 mmol of dicyclopentyldimethoxysilane and 0.5 mmol of vinyltriethoxysilane were used as external electron donors, and 400 Nml of hydrogen was put in, the polymerization was performed in exactly the same way as in Example 1, the results thereof being shown in Table 1.

TABLE 1

Result of Polymerization

| | Polymerization condition | | | | | | | Result | | | |
|---|---|---|---|---|---|---|---|---|---|---|---|
| | External electron donor(1) | | External electron donor(2) | | External electron donor(3) | | H$_2$ | activ--ity (kg-P P/g-cat. h.) | residue after extract -ion with n-heptane | melt flow rate (g/10 min.) 230° C., 2.16 Kg) | Bulk Density (g/ml) | (Mw/ Mn) |
| Examp. | Kind | mmd | Kind | mmd | Kind | mmd | (Nml) | | | | | |
| Examp. 1 | DCPDMS | 0.10 | CHMDMS | 0.8 | VTES | 0.10 | 100 | 3.7 | 98.0 | 6.3 | 0.41 | 6.9 |
| Examp. 2 | DCPDMS | 0.15 | CHMDMS | 0.7 | VTES | 0.15 | 100 | 3.7 | 98.3 | 5.7 | 0.39 | 7.1 |
| Examp. 3 | DCPDMS | 0.20 | CHMDMS | 0.6 | VTES | 0.20 | 100 | 3.6 | 98.5 | 4.7 | 0.40 | 7.5 |
| Examp. 4 | DCPDMS | 0.25 | CHMDMS | 0.5 | VTES | 0.25 | 100 | 3.2 | 98.0 | 8.0 | 0.40 | 7.6 |
| Examp. 5 | DCPDMS | 0.45 | CHMDMS | 0.1 | VTES | 0.45 | 100 | 3.0 | 98.1 | 3.5 | 0.38 | 8.0 |
| Examp. 6 | DCPDMS | 0.25 | CHMDMS | 0.5 | VTES | 0.25 | 200 | 3.0 | 97.6 | 10.7 | 0.40 | 7.5 |
| Examp. 7 | DCPDMS | 0.25 | CHMDMS | 0.5 | VTES | 0.25 | 400 | 3.7 | 98.0 | 19.5 | 0.40 | 7.4 |
| Comp. 1 | DCPDMS | 1.0 | — | — | — | — | 100 | 4.3 | 98.3 | 3.7 | 0.39 | 5.8 |
| Comp. 2 | CHMDMS | 1.0 | — | — | — | — | 100 | 3.5 | 96.3 | 10.1 | 0.37 | 5.9 |
| Comp. 3 | VTES | 1.0 | — | — | — | — | 100 | 0.6 | 95.4 | 39.4 | 0.35 | 5.7 |
| Comp. 4 | DCPDMS | 0.5 | VTES | 0.5 | — | — | 100 | 3.1 | 97.2 | 2.9 | 0.32 | 8.0 |
| Comp. 5 | DCPDMS | 0.5 | VTES | 0.5 | — | — | 200 | 3.5 | 98.0 | 4.7 | 0.34 | 8.0 |
| Comp. 6 | DCPDMS | 0.5 | VTES | 0.5 | — | — | 400 | 3.2 | 98.0 | 13.0 | 0.34 | 7.5 |

* DCPDMS: Dicyclopentyldimethoxysilane
CHMDMS: Cyclohexylmethyldimethoxysilane
VTES: Vinyltriethoxysilane Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for polymerization or copolymerization of an α-olefin, comprising:
    contacting the α-olefin with a catalytic system, wherein the catalytic system promotes polymerization of the olefin, and wherein the catalytic system comprises:
    (a) a solid complex titanium catalyst comprising magnesium, a halogen-containing titanium compound, and at least one internal electron donor;
    (b) an organometallic compound of metal belonging to the group consisting of Groups I and III on the periodic table of elements;
    (c) dicyclopentyldimethoxysilane;
    (d) cyclohexylmethyldimethoxysilane; and
    (e) vinyltriethoxysilane.

2. The method of claim 1, wherein the internal electron donor comprises esters of monoethyleneglycol, diethyleneglycol, triethyleneglycol, polyethyleneglycol, monopropyleneglycol, or dipropylglycol.

3. The method of claim 1, wherein the organometallic compound comprises trialkylaluminum.

4. The method of claim 1, wherein the α-olefin is propylene.

5. The method of claim 1, wherein the internal electron donor comprises water, alcohols, phenols, aldehydes, ketones, carboxylic acids, carboxylic acid chlorides, esters, esters of glycol derivatives, ethers, acid amides, ammonia, amines, nitrites, or isocyanates.

6. The method of claim 1, wherein the concentration of the titanium catalyst is between about 0.001 mmol per liter to about 5 mmol per liter, and wherein the ratio of atoms of the organometallic compound to titanium atoms of the titanium catalyst is between about 1:1 to about 2000:1.

7. The method of claim 1, wherein the contacting the α-olefin with the catalytic system is performed at a temperature between about 20° C. to about 200° C., and at a pressure ranging from atmospheric to about 100 atmospheres.

* * * * *